(12) United States Patent
Arimura

(10) Patent No.: US 8,299,786 B2
(45) Date of Patent: Oct. 30, 2012

(54) AXIALLY SYMMETRIC VERTICAL MAGNETIC FIELD COMPONENT EXCITING SENSOR SYSTEM

(75) Inventor: Kunitaka Arimura, Kawasaki (JP)

(73) Assignee: Smart Co., Ltd., Kanagawa (JP)

( * ) Notice: Subject to any disclaimer, the term of this patent is extended or adjusted under 35 U.S.C. 154(b) by 677 days.

(21) Appl. No.: 12/224,143

(22) PCT Filed: Feb. 20, 2007

(86) PCT No.: PCT/JP2007/053077
§ 371 (c)(1),
(2), (4) Date: Aug. 19, 2008

(87) PCT Pub. No.: WO2007/097322
PCT Pub. Date: Aug. 30, 2007

(65) Prior Publication Data
US 2009/0315553 A1 Dec. 24, 2009

(30) Foreign Application Priority Data
Feb. 20, 2006 (JP) .................... 2006-042297

(51) Int. Cl.
*G01R 33/02* (2006.01)

(52) U.S. Cl. .................................. 324/258; 324/260
(58) Field of Classification Search .................. None
See application file for complete search history.

(56) References Cited

U.S. PATENT DOCUMENTS

| | | | | |
|---|---|---|---|---|
| 6,018,298 A | * | 1/2000 | Endo et al. | 340/572.5 |
| 7,315,248 B2 | * | 1/2008 | Egbert | 340/572.7 |
| 7,495,625 B2 | * | 2/2009 | Endo et al. | 343/788 |

FOREIGN PATENT DOCUMENTS

JP 2004-166175 A * 6/2004

* cited by examiner

*Primary Examiner* — Vinh Nguyen
(74) *Attorney, Agent, or Firm* — James Creighton Wray

(57) ABSTRACT

The present invention provides an axially symmetric vertical magnetic field component sensor system capable of intensifying vertical magnetic field components. The sensor system comprises an axially symmetrical magnetic substance comprising a circular, oval or polygonal shaped flat disk and a protrusion formed on a center of the flat disk. The sensor system is used for a response system having an IC wound by a coil which generates signals and the sensor system is mounted on a metal surface or buried in a hollow formed on the metal surface.

18 Claims, 18 Drawing Sheets

(a)  (b)

(a)  (b)

(a)　　　　　　　　　　　(b)

(a)

(b)

(a)

(b)

(c)

(a)

(b)

(a)

(b)

AXIALLY SYMMETRIC VERTICAL MAGNETIC FIELD COMPONENT EXCITING SENSOR SYSTEM

This application claims the benefit of Japanese Application No. 2006-042297 filed Feb. 20, 2006 and PCT/JP2007/053077 filed Feb. 20, 2007, which are hereby incorporated by reference in their entirety.

FIELD OF THE INVENTION

The present invention relates to an axially symmetric vertical magnetic field component exciting sensor system, which is applied to an RFID tag or a sensor buried in a metal body or in a hole on a metal surface.

RELATED BACKGROUND ART

Since a non-contact type IC card and an RFID tag having a coil therein as well as a sensor for a reader/writer used together with the IC card and the RFID tag are actuated in a magnetic field or an electric field generated by a high frequency vibration, their sensitivities are greatly deteriorated due to a mirror effect which offsets the magnetic field or the electric field, if such sensors are placed closely to a metal bed or metal surface.

This is due to a phenomenon that the electric field or a magnetic field around the sensor is compensated with a generated electric field or a magnetic field by a reverse phased current due to the mirror effect. In other words, properties of such sensor are spoiled, compared with a case when the metal bed is not applied closely to the sensor.

There is a structure called "on metal", where a magnetic sheet is inserted between a coil of the RFID and the metal surface in order to prevent the sensitivities from being deteriorated. Although this structure is effective to a certain extent, merely a portion of magnetic field directs to a vertical direction to the metal surface, since the magnetic field is influenced by the metal surface and since magnetic field components parallel to and near the metal surface are compensated each other.

Since only a center portion of a circularly wound coil generates vertical components of the magnetic field, it is difficult to obtain a strong magnetic field. Therefore this method is considered to be rather a passive one.

In a method proposed and filed as a patent application (not disclosed yet) by the applicant, a magnetic flux density is doubled, namely a voltage is increased by 6 dB by utilizing the mirror effect. This method can intensify a magnetic field mainly in a direction along the metal face as well as a vertical direction, but vertical magnetic field components are attained only in limited areas close to both magnetic poles.

In another method proposed and filed as another patent application (not disclosed yet) by the applicant, strong vertical magnetic field components are obtained in the center of the magnetic field by utilizing combined rods of a square cross-section. However, sometimes it is difficult to obtain such combination of the rods, when a hole is required on the surface of the combined rods for burying the tag.

DISCLOSURE OF THE INVENTION

Problems to be Solved by the Invention

The objective of the present invention is to provide a tag or a sensor system capable of acquiring circular electric current around vertical magnetic field components by utilizing parallel components of the magnetic field to a metal surface as well as vertical components of the magnetic field which are generated by utilizing the metal surface.

The present invention is carried out in view of the above-mentioned objective in order to provide an axially symmetric vertical magnetic field component exciting sensor system, which constitutes a tag and a sensor system capable of intensifying vertical magnetic field vertical components.

Means to Solve the Problem

In order to solve the problems mentioned above, the sensor system is constituted as follows.

As stated in claim 1, the axially symmetric vertical magnetic field component exciting sensor system comprises an axially symmetrical magnetic substance comprising a circular, oval or polygonal shaped flat disk and a protrusion formed on a center of the flat disk, wherein: the sensor system is used for a response system having an IC wound by a coil which generates signals, and the sensor system is mounted on a metal surface or buried in a hollow formed on the metal surface.

As stated in claim 2, in the sensor system described in claim 1, the protrusion of the magnetic substance is formed in a cylindrical, oval-cylindrical, polygonal, polygonal, circular, oval or polygonal pyramid shape.

As stated in claim 3, in the sensor system described in claim 1, the lower surface of the flat disk of the magnetic substance is constituted so as to be fitted to the metal surface.

As stated in claim 4, in the sensor system described in claim 1, a hollow is formed partially along the central axis of the magnetic substance.

As stated in claim 5, in the sensor system described in claim 1, a metal rod is buried along the central axis of the magnetic substance.

As stated claim 6, in the sensor system described in claim 1, a coil is wound around circularly parallel to the flat disk of the magnetic substance.

As stated in claim 7, in the sensor system described in claim 1, a coil is wound around circumference (in a $\psi$ direction) of the protrusion in a parallel direction to the central axis of the magnetic substance.

As stated in claim 8, in the sensor system described in claim 1, a coil is wound circularly on the flat disk of the magnetic substance in a radial direction parallel to the metal surface.

As stated in claim 9, in the sensor system described in claim 1, a metal thin plate or a metal foil coil is fitted to the rear surface of the flat disk opposite to the protrusion of the magnetic substance so as to form the metal surface. The metal surface can be formed by a deposition or a printing method.

As stated in claim 10, in the sensor system described in claim 1, a conventional circular or rectangular tag is mounted on and in the center of the flat disk of the magnetic substance by threading through the protrusion of the magnetic substance.

As stated in claim 11, in the sensor system described in claim 1, a hole is formed in the center of a conventional circular or rectangular tag so as to be threading through the protrusion of the magnetic substance and to be fixed to the flat disk of the magnetic substance.

As stated in claim 12, in the sensor system described in claim 1, the magnetic substance further comprises an outer ring structured cylinder formed on a circumference of the flat disk.

As stated in claim 13, in the sensor system described in claim 1 or claim 12, a metal thin plate or a metal foil coil is fitted to the outer circumference of the ring structured cylinder of the magnetic substance so as to form the metal surface. The metal surface can be formed by a deposition or a printing method.

As stated in claim 14, in the sensor system described in claim 1 or claim 12, an IC is fitted to an available space in the magnetic substance.

As stated in claim 15, in the sensor system described in claim 1 or claim 12, an IC, a sensor, a capacitor and battery are mounted on available spaces in the magnetic substance.

As stated in claim 16, in the sensor system described in claim 1 or claim 12, a hole is formed on the metal surface such that the assembled magnetic substance is snugly fitted in, and the hole has nearly the same diameter, the same shape and the same depth as those of the magnetic substance.

As stated in claim 17, in the sensor system described in claim 1 or claim 12, a top end of the outer ring structured cylinder of the magnetic substance, which is fitted to the metal surface, is formed partially wider.

As stated in claim 18, in the sensor system described in claim 1 or claim 12, Z axis of the magnetic substance is formed longer so as to be fitted to a deep hole of the metal surface.

As stated in claim 19, a detecting system can be constituted by employing the tag or sensor system described in one of claims 1 to 18.

EFFECTS ATTAINED BY THE INVENTION

The present invention succeeds in providing the axially symmetric sensor system capable of exciting or capturing vertical magnetic field components. The sensor system works without deteriorating its sensitivity without fail, even when a tag or a coiled sensor is mounted on the metal surface or buried in the metal surface, since the tag or the sensor can capture changes of the magnetic field excited by the sensor system in accordance with the tag or the sensor. Intense magnetic field (Magnetic Jet Field) perpendicular to the metal face can be obtained by the present invention, which overcomes conventional problems on the metal surface.

An electric current or a magnetic field is generated by a wire loop. The generated electric current is a circular one flowing a $\psi$ direction and the generated magnetic field is oriented in a radius ($\rho$) direction in a polar coordinate system.

In the above mentioned vertical magnetic field component exciting sensor systems invented and filed as patent by the applicant, coils are wound around rectangular magnetic substances and the sensor systems are constituted by combining the coiled magnetic substances.

The sensor systems by the present invention have axially symmetric structure and are constituted to be fitted to vertical magnetic field components and the circular electric current (eddy current). Further, by employing magnetic substance comprising the flat disk having a high magnetic permeability and the cylindrical protrusion or cone formed on the center of the flat disk, horizontal magnetic field components $H\rho$ in a radial direction are converted into vertical magnetic field components $Hz$. The vertical magnetic field components $Hz$ are excited by central portions of the coil, but most of the vertical magnetic field components are effectively converted from the horizontal magnetic field components $H\rho$ excited in the flat disk. In ordinary metal tag methods, most of the horizontal magnetic field components $H\rho$ are offset by those excited in symmetrical positions, so that vertical magnetic filed components can be hardly obtained.

The vertical magnetic field components are effectively guided by a vertical magnetic path formed in the protrusion of the magnetic substance, at the same time the vertical magnetic field components are enhanced by a coil wound around the protrusion and by a metal rod inserted in the center of the magnetic substance, such that the horizontal magnetic field components $H\rho$ are converted into the vertical magnetic field components $Hz$. As a result very intense vertical field magnetic components are generated in the center portion of the sensor system by the present invention.

PREFERRED EMBODIMENTS BY THE PRESENT INVENTION

Figure 1:
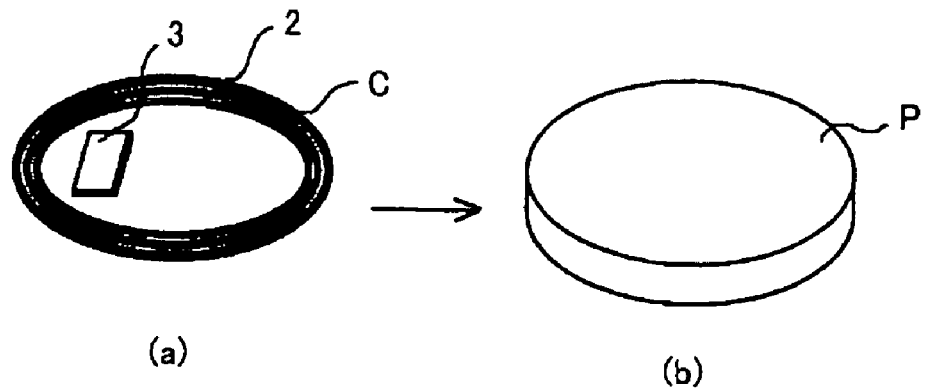
FIG. 1 is schematic views for explaining a conventional tag.

Hereinafter, the preferred embodiments by the present invention are explained in details.
Embodiment FIG. 1 is schematic views for explaining the conventional tag. FIG. 1(a) is a conventional tag where an IC 3 is attached to a coil C constituted by wound wire 2. FIG. 1(b) is a perspective view illustrating a plastic package in which the tag shown in FIG. 1(a) is embedded.

Figure 2:
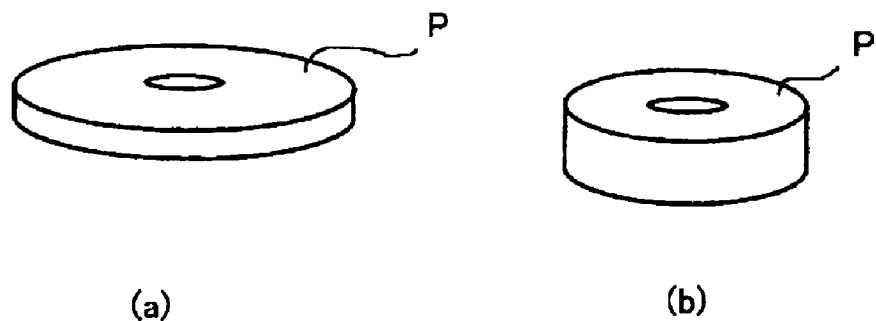
FIG. 2 is schematic perspective views illustrating plastic disk packages with center holes for tags.

FIG. 2 is the schematic perspective views illustrating plastic packages P with center holes. In these packages P, tags as illustrated in FIG. 1(a) are embedded. Magnetic substances can be arranged or inserted in the holes of the plastic packages P. The plastic package shown in FIG. 2(a) is for a thinner tag and the plastic package shown in FIG. 2(b) is for a thicker tag. The packages shown in FIG. 2 have center holes, but packages without center holes are usually used.

Figure 3:
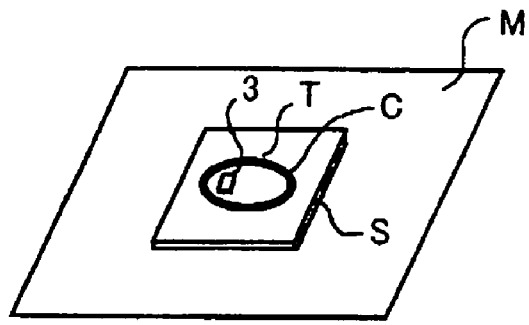
FIG. 3 is a schematic view for explaining how to prevent magnetic field from offsetting by a mirror effect on a metal surface, by inserting a magnetic sheet S between a tag T and a metal surface M.

FIG. 3 shows a method how to prevent magnetic field from offsetting by the mirror effect on the metal surface, by inserting the magnetic sheet S between a conventional tag T and the metal surface M, so that magnetic flux is diverted by the magnetic sheet S. This method is generally employed.

However, since coils are wound spirally in a radial direction in order to keep the tag as thin as possible, the magnetic field Hρ directs in a radial direction and the magnetic field is excite so that magnetic intensity increases along the radial direction.

Figure 4:
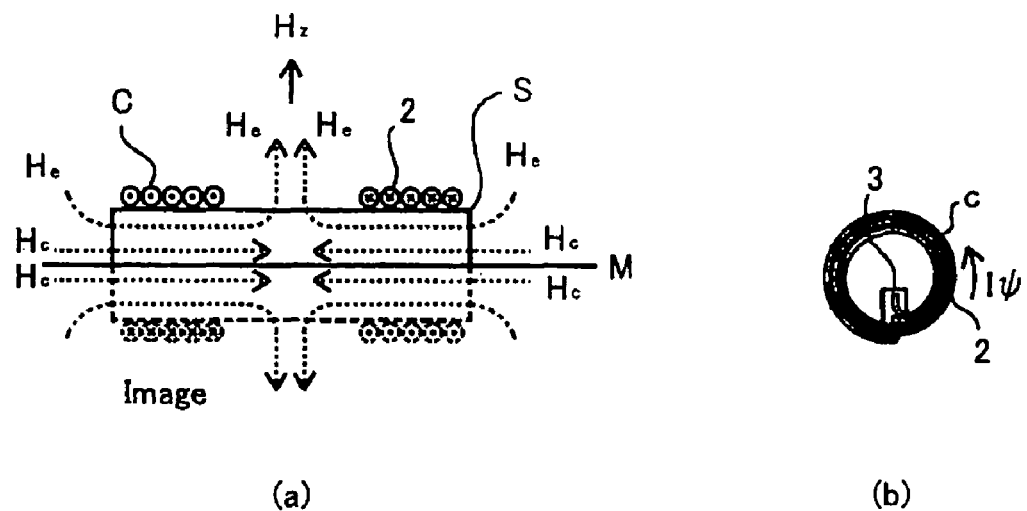
FIG. 4 is schematic views for explaining a magnetic field generating arrangement usually employed in conventional tags.

FIG. 4(a) shows a magnetic field distribution pattern in an ordinary on-metal tag shown in FIG. 4(b).

FIG. 4(a) is a cross-sectional view of the metal tag where a coil C is wound in a radial direction in order to constitute the tag thin and flat. When an electric current Iψ flows in the coil C, components Hc and He of the magnetic field are excited in magnetic sheet S laid between the coil C and a metal surface M. The components Hc near the metal surface M are strong, but since they direct in the center and they collide with each other so that they disappear in the center. Since only the electric current flowing in inner portions of the coil C excites vertical magnetic field components Hz, the vertical magnetic field components are not so intense. And since a vertical magnetic path is not constituted by the magnetic sheet S, it is difficult to generate intense vertical magnetic field components.

A mirror image is generated under the metal surface M, so that a reversed image is obtained.

FIG. 4(b) is a plan view of the coil C where the wire 2 is spirally wound.

Figure 5:
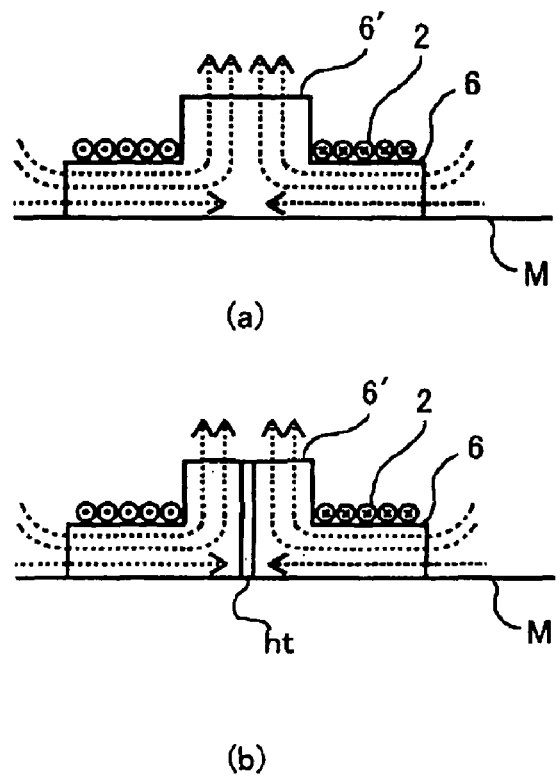
FIG. 5 is cross-sectional views for explaining one of the embodiments.

FIG. 5 is cross-sectional views for explaining one of the embodiments.

FIG. 5(a) shows a magnetic substance having a cylindrical protrusion in its center functioning as a magnetic path. Different from the conventional example shown in FIG. 4, since a vertical magnetic path 6' is formed in the center of the magnetic substance as an axially symmetric cylindrical protrusion, the magnetic field along the metal surface in a radial direction is diverted vertically in the center of the magnetic substance so that almost all horizontal magnetic field components divert to vertical magnetic field components Hz running along the magnetic path. Portions of the horizontal magnetic field components near the surface collide with and cancel each other.

FIG. 5(b) shows a magnetic substance having a vertical hole ht in the center. In this case, portions of magnetic field components collide with and canceled each other, but most portions of the components run along the vertical magnetic path so that intense magnetic vertical components are excited. If a metal rod or a metal surface is arranged in the vertical hole ht, an electric current will be caused circularly around the metal rod, so that vertical magnetic field components Hz are excited, as a result most of the magnetic field components are converted to the vertical magnetic field components.

Although a circumference of the metal rod is small, it is equivalent to an infinite circumference in a polar coordinate system, so that equivalent effects are attained even in the case of the metal rod.

Figure 6:
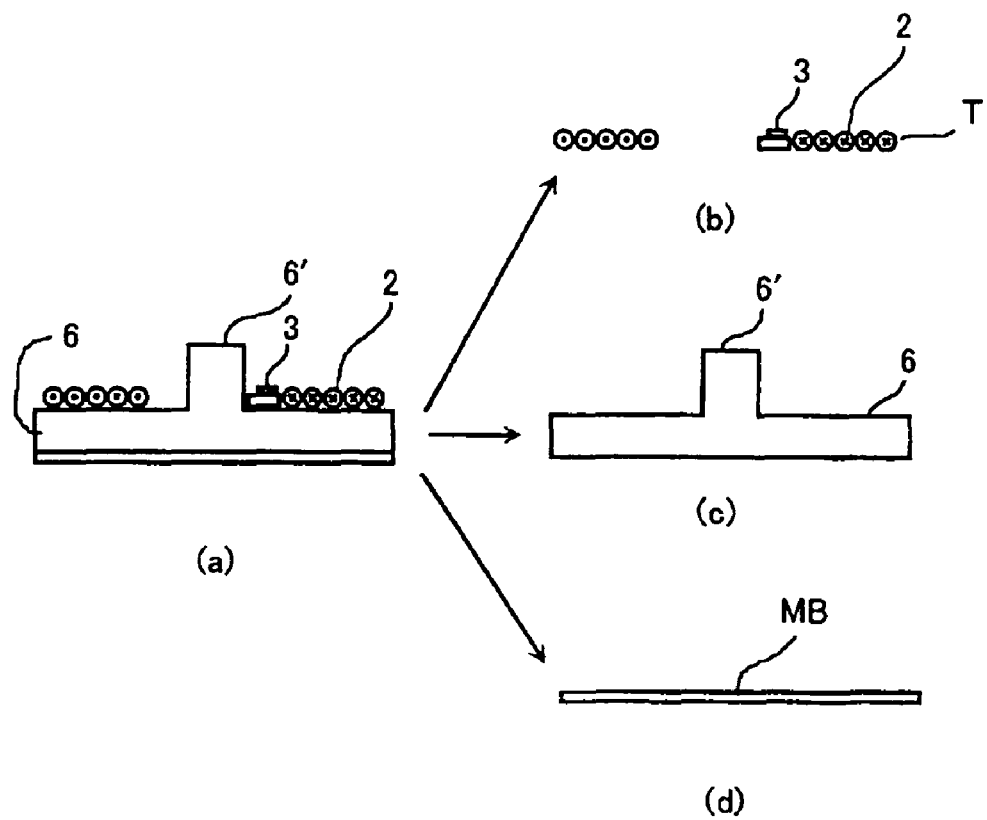
FIG. 6 is cross-sectional views for explaining other embodiment.

FIG. 6 is cross-sectional views for explaining other embodiment.

FIG. 6(a) is a cross-sectional view of the embodiment configured as a tag system. A coil 2 is mounted on a magnetic substance disk having an axially symmetric cylindrical protrusion in its center. An IC 3 mounted on a substrate is attached to the coil. A metal plate MB, a metal foil or a deposited metal layer is fitted to a lower surface of the magnetic substance disk.

FIG. 6(b) shows the coil 2 to which the IC 3 is attached. FIG. 6(c) shows magnetic substance disk where a horizontal magnetic path 6 is formed with a cylindrical protrusion where a vertical magnetic path 6' is formed. FIG. 6(d) shows the metal plate MB.

Figure 7:
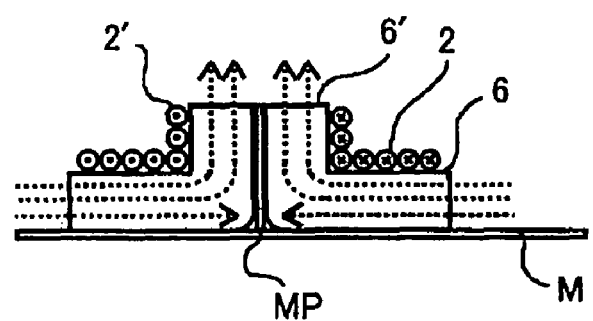
FIG. 7 is a cross-sectional for explaining one of the other embodiments.

FIG. 7 shows one of the other embodiments, where a metal rod MP is inserted in a center hole of a magnetic substance disk. The metal rod MP is contacted to a metal surface M, so that circular electric currents are caused in the metal surface and the metal rod MP.

A coil 2 is circularly wound on the surface of the magnetic substance disk and in the center of the disk a coil 2' is wound around an axially symmetric cylindrical protrusion for the vertical magnetic path 6'. Vertical magnetic field components are excited particularly by the coil 2' wound around the magnetic path 6', so that intense vertical magnetic field components are obtained together with vertical components diverted from the horizontal magnetic field components. In FIG. 7, an IC is omitted.

Figure 8:
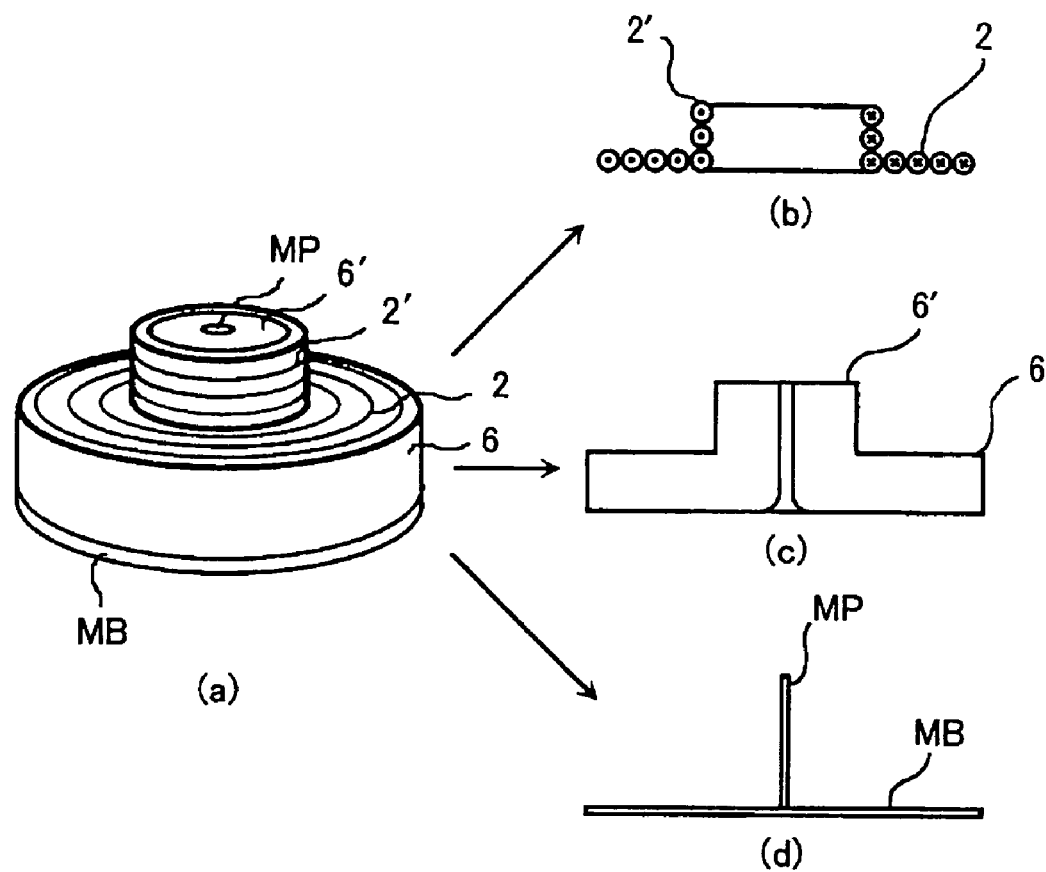
FIG. 8 is cross-sectional views for explaining respective components shown in FIG. 7.

FIG. 8 shows components of the embodiment shown in FIG. 7 respectively.

FIG. 8(a) is a perspective view illustrating an assembled sensor system. FIG. 8(b) is a cross-sectional view of the coils 2, 2'. FIG. 8(c) is a cross-sectional view of the magnetic substance disk where the horizontal magnetic path 6 is formed and its cylindrical protrusion where the vertical magnetic path 6' is formed. FIG. 8(d) is a cross-sectional view of the metal plate MB and the metal rod MP.

Figure 9:
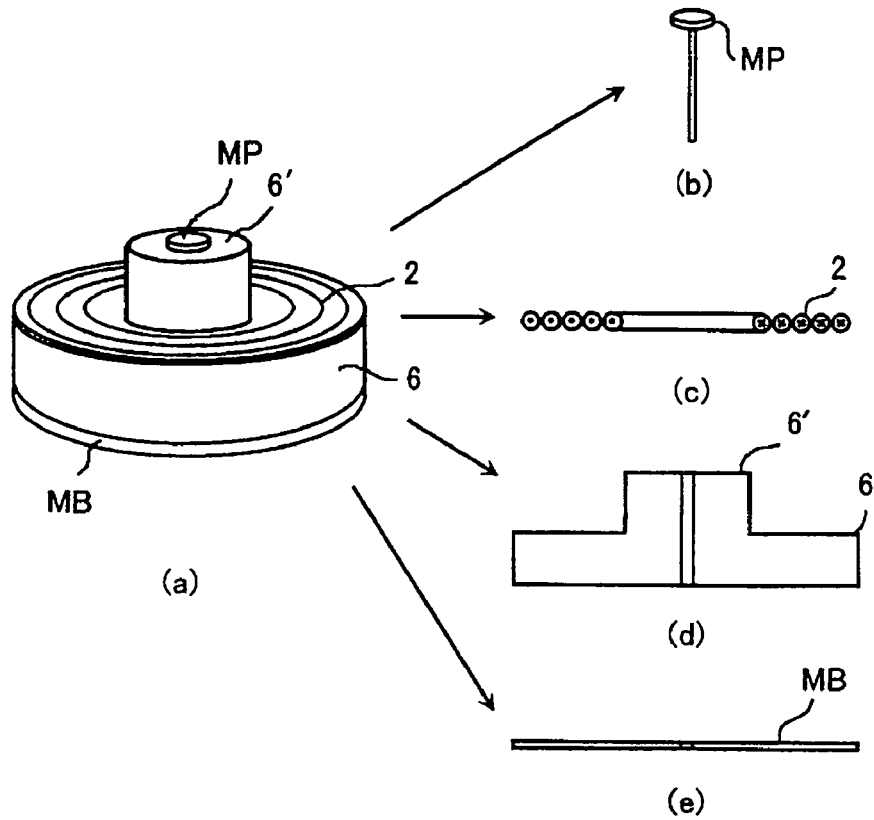
FIG. 9 is cross-sectional views of components of one of the embodiments.

FIG. 9 shows components of the other embodiment respectively.

FIG. 9(a) is a perspective view illustrating an assembled sensor system.

FIG. 9(b) is a perspective view of a metal rod MP which is inserted into a center hole of the magnetic disk for the horizontal magnetic path 6. The metal rod MP is formed as a threaded rod for fixing other components together.

FIG. 9(c) is a cross-sectional view of the coil 2 for exciting magnetic vertical components. FIG. 9(d) is a cross-sectional view of the magnetic substance disk and its cylindrical protrusion. FIG. 9(e) is a cross-sectional view of the metal plate MB. The IC is also omitted in these drawings.

Figure 10:
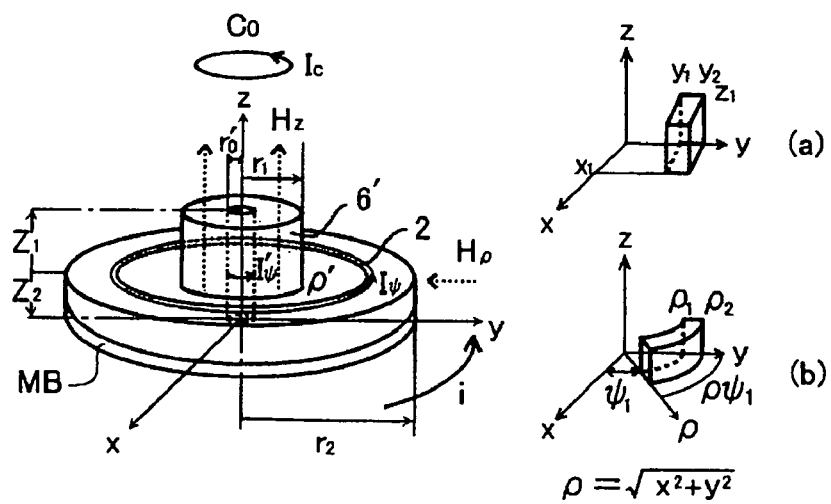
FIG. 10 is schematic perspective views for explaining an axially symmetric vertical magnetic field components exciting censor system.

FIG. 10 is schematic perspective views for explaining a principle of the axially symmetric vertical magnetic field component exciting sensor system. In FIG. 10, a polar coordinate system is employed.

In this coordinate system, ψ is set "0" in X coordinate, ρ is set as a radial direction, and a X-Y plane at Z=0 is considered to be a metal surface. Let's assume that a magnetic disk with a thickness $Z_2$ and a radius $r_2$. A magnetic cylindrical protrusion with a height $Z_1$ and a radius $r_1$ is formed on the magnetic disk and connected to the center of the magnetic disk. A center hole with a radius r is formed such that the hole extends through the center portions of the connected disk and cylinder. A metal rod is inserted in the center hole. If an electric current Iψ flows in the coil 2 mounted on the magnetic disk, horizontal magnetic field components Hρ are excited in a radial direction and vertical magnetic field components Hz are also excited partially. If the coil 2 is wound with a plurality of turns, the vertical magnetic field components caused neighboring turns are compensated each other, so that only the horizontal magnetic field components Hρ are enhanced.

However, if the vertical magnetic path 6' is formed by the axial symmetric cylindrical protrusion in the center, the horizontal magnetic field components H ρ run along the vertical magnetic path 6' and diverted into the vertical magnetic field components Hz. The vertical magnetic field components are also excited by I'ψ which flows around a surface of the metal rod MP inserted in the center hole.

If a cylindrical coil 2' is wound around the axially symmetric cylindrical protrusion as shown in FIGS. 7 and 8, vertical magnetic field components are added so that the vertical magnetic field components are more intensified. An electric current Ic is excited in the cylindrical coil by the vertical magnetic field components. These phenomena can be thought in a reversed way, which goes as follows. The vertical magnetic field components are excited by the electric current Ic which flows in an upper coil Co. The excited vertical magnetic field components are run through the vertical magnetic path 6' in the axially symmetric cylindrical protrusion and run through the horizontal magnetic path 6, which excites the electric current Iψ in the coil 2 and also excites an electric current i on metal surface.

FIG. 10(a) shows a rectangular X, Y, Z coordinate system. When Z-X plane is rounded around Z-axis, Z-X plane becomes ψplane in a polar coordinate system as shown in FIG. 10(b). ρ in the polar coordinate system can be defined as follows:

$$\rho = \sqrt{X^2 + Y^2}$$

$X_1$, $Y_1$ and Z in the rectangular coordinate system are respectively converted into $\rho_1$, $\rho\psi_\square$ and Z in the polar coordinate system.

Figure 11:
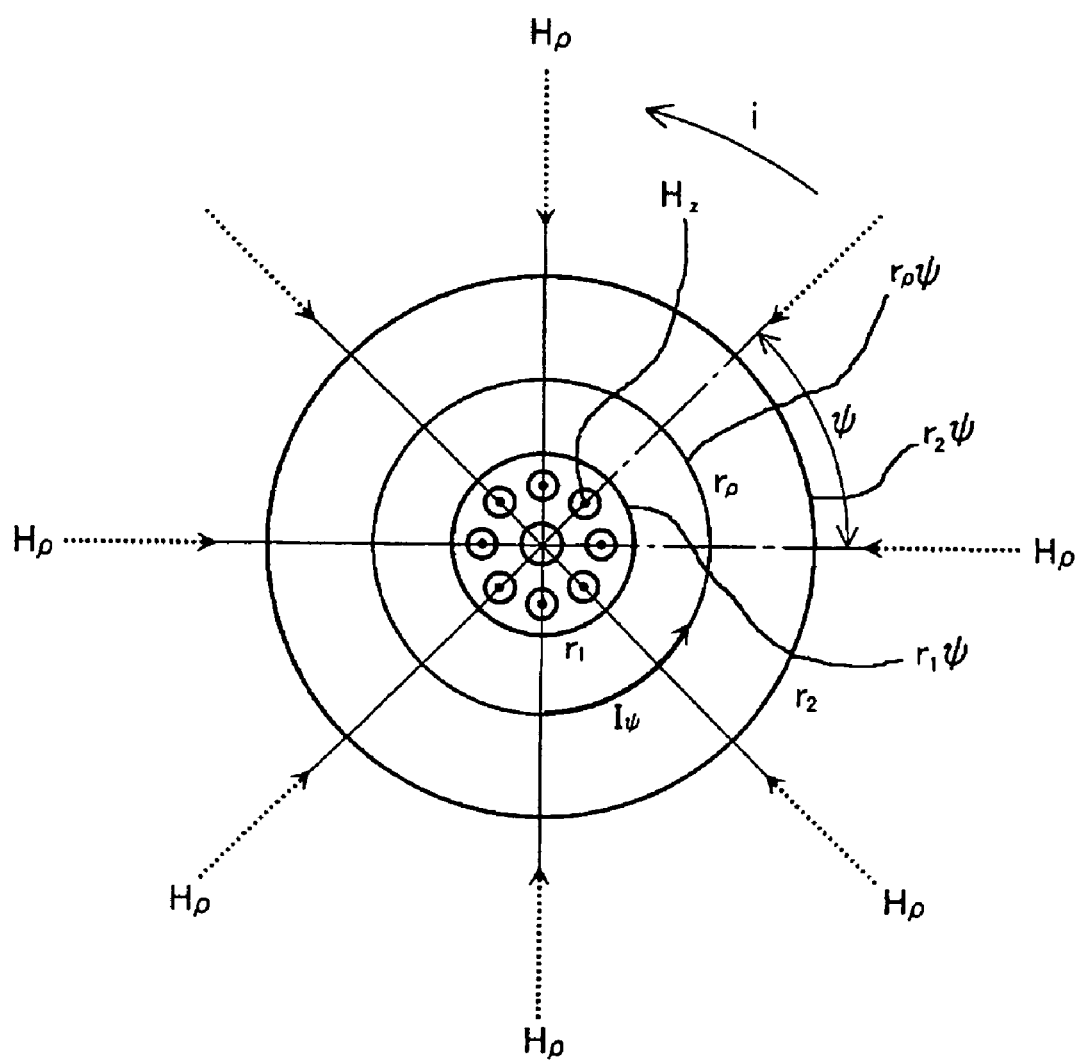
FIG. 11 is a plan view of the sensor system shown in FIG. 10

FIG. 11 is the plan view of the sensor system shown in FIG. 10

In this drawing, vertical magnetic field components Hz running upward are illustrated in the cylindrical protrusion with a diameter $r_1$. The horizontal magnetic field components Hρ in a radial direction in the magnet disk are excited by the electric current Iψ flowing in the coil perpendicular to the horizontal magnetic field components so that the horizontal magnetic field components H ρ are diverted into upward as the vertical magnetic field components Hz. The surface electric current i on the metal plate also flows in the same direction as the electric current Iψso that horizontal magnetic field components perpendicular to a flowing direction of the electric current are excited and run through the magnetic path in the cylindrical protrusion. These magnetic field components induce voltages in the coils 2, 2'.

Figure 12:
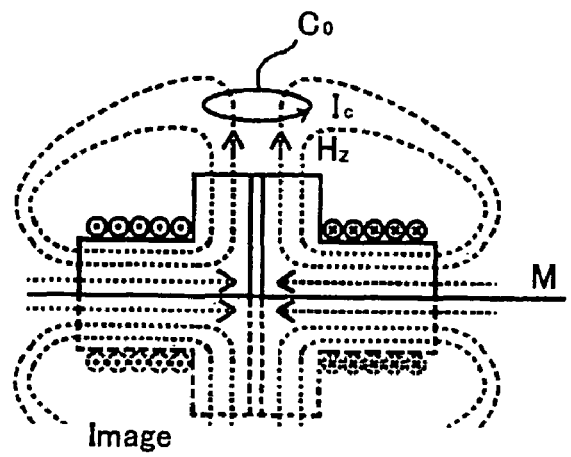
FIG. 12 is cross-sectional views for explaining magnetic interactions between the sensor system by the present invention and an external coil.
Figure 12:
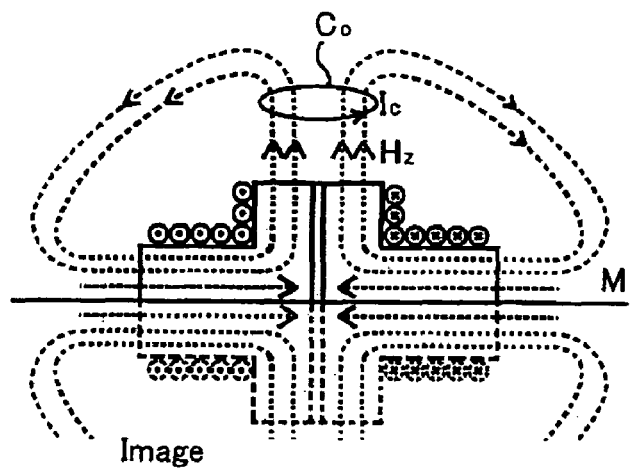
Figure 12:
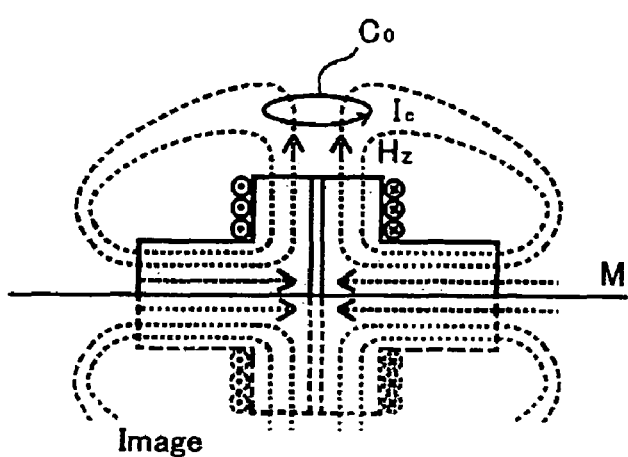
Figure 13:
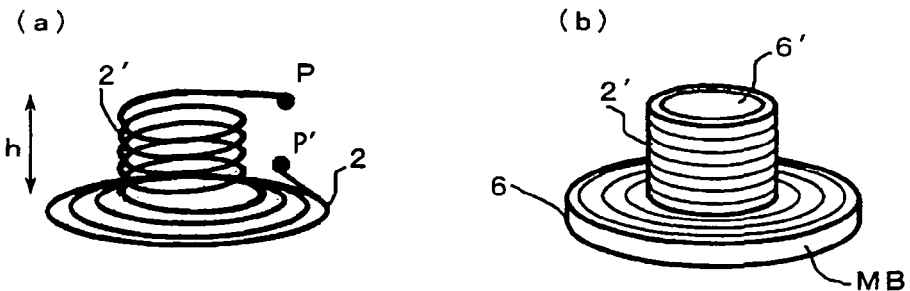
FIG. 13 is a constitution of one of the vertical magnetic components exciting sensor systems and its coil configuration.
Figure 14:
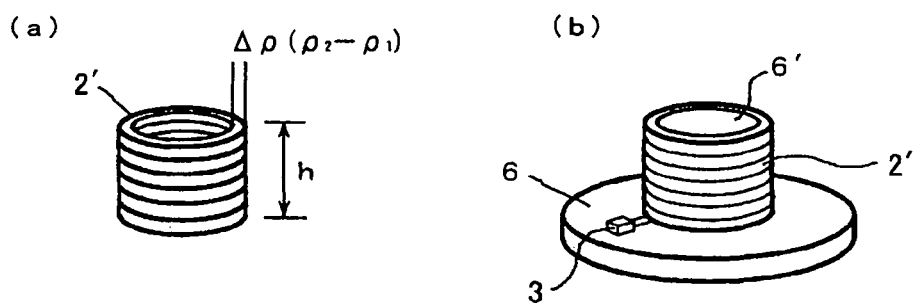
FIG. 14 is a constitution of one of the vertical magnetic components exciting sensor systems and its coil configuration.

FIG. 12 is the cross-sectional views for explaining magnetic interactions between the vertical magnetic field components Hz of the sensor system by the present invention and the external coil Co.

FIG. 12(a) shows a sensor system where the coil is mounted only on the disk. FIG. 12(b) shows a sensor system where the coil is also wound around the cylindrical protrusion, which can excite the vertical magnetic field components Hz more easily, so that an electric current Ic can be easily induced in the external coil Co situated above. FIG. 12(c) shows a sensor system where the coil is wound only around the cylindrical protrusion. Sufficient vertical magnetic field components can be obtained by this configuration. However, since more intense magnetic field components can be obtained by the sensor system shown in FIG. 12(b), so that the sensor system can interact with the external coil Co arranged above. The turning number of the coil is determined depending on a size of the coil and a magnetic substance. But usually an inductance value is several micro Henry at 13.56 μHz, so that the turning number is rather small. The coil 2 and coil 2' can be wound either in series or in parallel.

Since the coil should resonate with a capacitor in the IC, the coil is adjusted depending on the employed IC.

FIGS. 13, 14, 15, 16 and 17 are constitutions of the vertical magnetic field component exciting sensor systems and their coil configurations.

FIG. 13(a) shows a coil configuration where a flat coil 2 on the disk and vertical coil 2' around the cylindrical protrusion are connected in series. Alternatively, these coils can be connected in parallel depending on respective coil winding manners and intensity of the inductance value. To the ends P, P' of the connected coil, a circuit board and an IC are connected. FIG. 13(b) shows an assembled status where the coils 2, 2' are respectively fitted to magnetic disk and cylindrical protrusion for magnetic paths 6, 6'.

FIG. 14(a) shows a coil configuration where coils 2, 2' are combined and wound around almost only the vertical cylindrical protrusion such that the combined coil has a thickness □ρ in a radial direction and a height h in a vertical direction. FIG. 14(b) shows an assembled status where coils are fitted to around the cylindrical protrusion for the vertical magnetic path 6' and IC 3 (or a circuit board) is mounted on an open space of the flat magnetic disk for the magnetic path 6 where no coils are wound.

Figure 15:
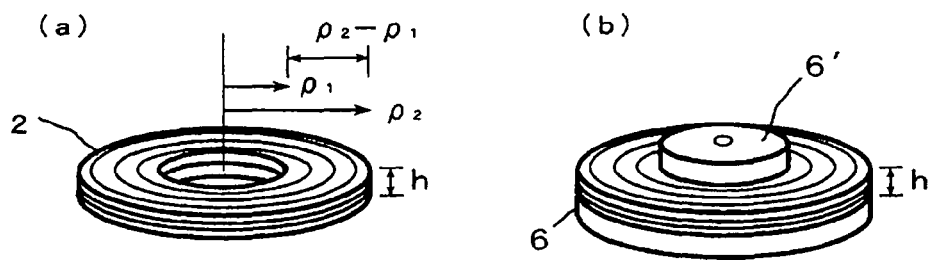
FIG. 15 is a constitution of one of the vertical magnetic components exciting sensor systems and its coil configuration.

FIG. 15 shows another constitution of one of the vertical magnetic component exciting sensor systems and its coil configuration. Different from the coil configuration shown in FIG. 14, only the coil 2 is wound in a radial direction on the flat magnetic disk so that the coil has a slight height h in the vertical direction. FIG. 15(b) shows an assembled status where the coil is mounted on the flat magnetic disk for the horizontal magnetic path 6.

Figure 16:
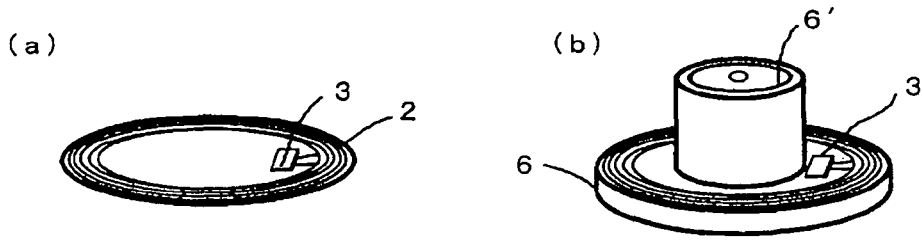
FIG. 16 is a constitution of one of the vertical magnetic components exciting sensor systems and its coil configuration.

FIG. 16 is the constitution of one of the vertical magnetic component exciting sensor systems and its coil configuration.

FIG. 16(a) shows the conventional tag shown in FIG. 1. Even when the conventional tag is applied to the horizontal magnet disk with the cylindrical protrusion as shown in FIG. 16(b), it works as an effective sensor system under the excited intense vertical magnetic field components.

Figure 17:
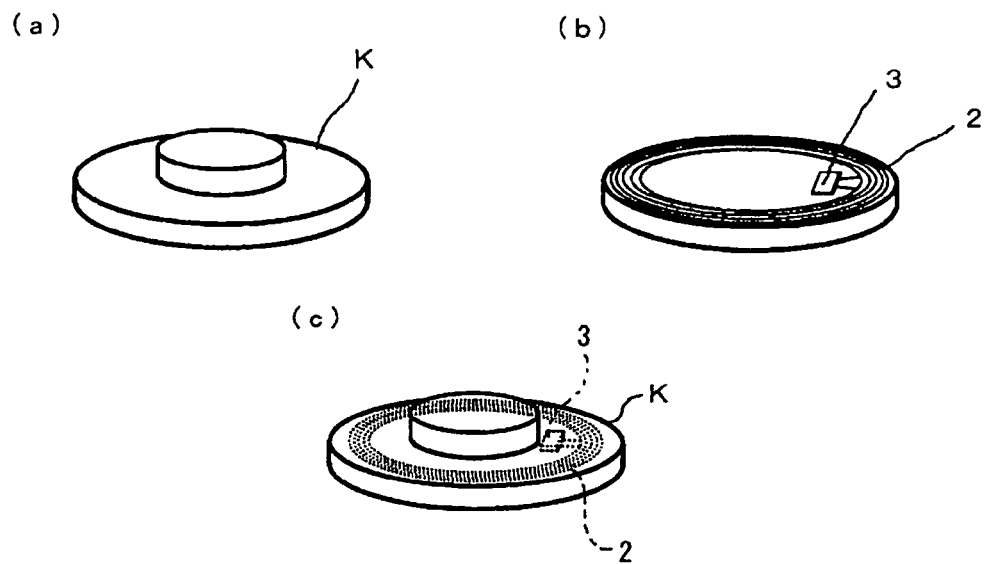
FIG. 17 is a constitution of one of the vertical magnetic components exciting sensor systems and its coil configuration.

FIG. 17 is a constitution of one of the vertical magnetic field component exciting sensor systems and its coil configuration. FIG. 17(a) shows a cap made of plastic or ceramic for fixing the coil 2 and the IC 3 shown in FIG. 17(b). As shown in FIG. 17(c), the coil and the IC are mounted on the flat magnetic disk with the cylindrical protrusion and covered by the cap shown in FIG. 17(a). The cap is used not only for protecting the coil and the IC, but also for controlling resonating frequencies of the coil by adding dielectric coefficient.

Figure 18:
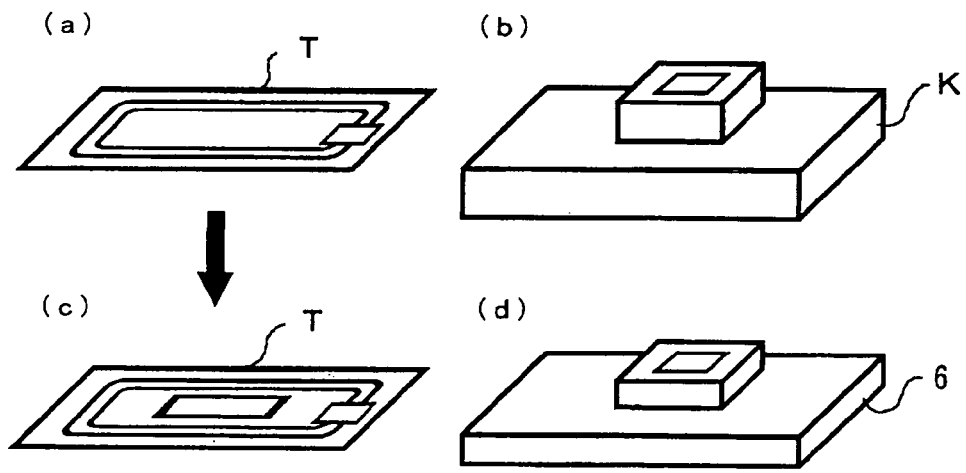
FIG. 18 is perspective views illustrating an ordinary film shaped square tag.

FIG. 18 is perspective views illustrating the ordinary film shaped square tag. FIG. 18(a) shows a film shaped square tag available in the market. FIG. 18(b) shows a cap for the square tag. FIG. 18(c) shows a film shaped square tag having a square hole in its center for applying a magnetic protrusion. FIG. 18(d) shows a square shaped magnetic substance. Other than square shape, the magnetic substance can be formed in circular, oval and the like.

Figure 19:
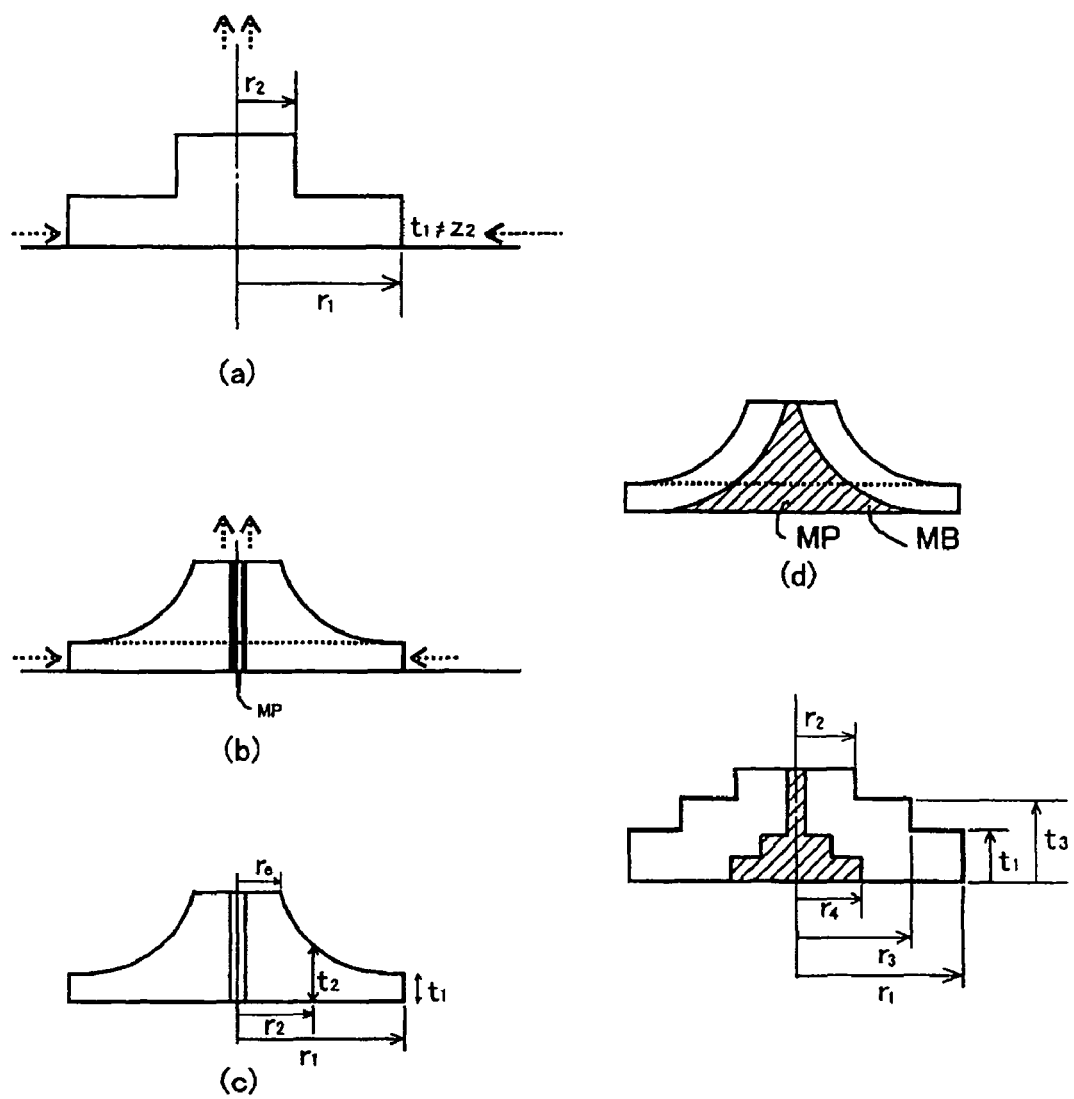
FIG. 19 is schematic views illustrating a relation between shape of a magnetic object and magnetic flux.

FIG. 19 is schematic views illustrating manners to control magnetic flux density by the shape of a magnetic object.

Since a magnetic field starting from a circumference of the disk (its radius=$r_1$ and thickness=$t_1$) in a radial direction decreases its size proportional to $1/2\pi r$ (=a distance from the center of the disk), in order to keep magnetic flux density being constant, a height t of the disk should be increased. And in order to keep a magnetic flux density of the vertical magnetic field components coming out from the upper surface having area of $\pi\square_\square^\square$ of the cylindrical protrusion being the same as that of the disk part, the following two equations should be satisfied.

$$\pi r_2^2 = 2\pi r_1 t_1, \text{ namely } r_2 = 1.414\sqrt{r_1 t_1}$$

$$2\pi r_1 t_1 = 2\pi r_2 t_2$$

In order to satisfy the above equations, a cross-section of the central cylindrical protrusion should be a curve like Mt. Fuji as shown in FIG. 19(b). In FIG. 19(c) a relation between a radius r and a height t is illustrated. FIG. 19(d) shows a cross-section of a combined metal rod MP with metal plate MB which is derived in the same way as explained above. FIG. 19(e) shows a modified combined metal rod which is formed stepwise in stead of smooth curved one.

Figure 20:
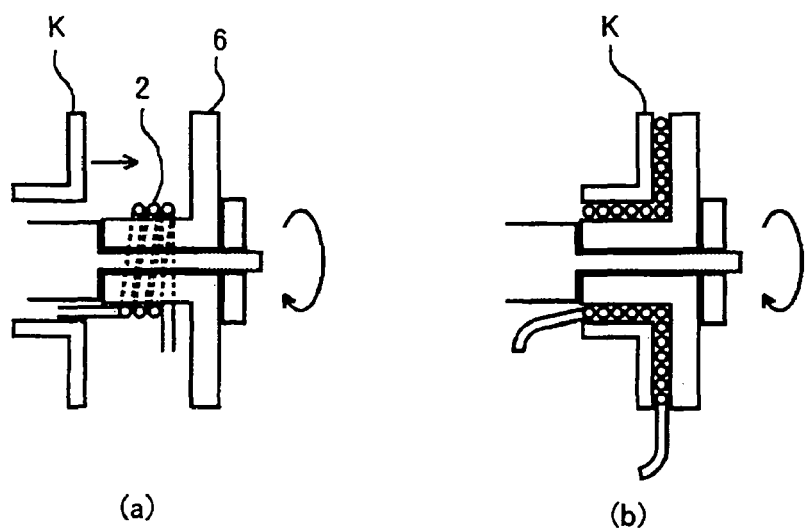
FIG. 20 is schematic views of coil winding manners around magnetic substances.

FIG. 20 is schematic views of coil winding manners around magnetic substances. The coil 2 is continuously wound around the cylindrical protrusion to the flat disk. As shown in FIG. 20(a), firstly the coil 2 is wound around the cylindrical protrusion. Then the coil 2 is wound on the flat disk in the radius direction by applying a cover K from a left side as shown in FIG. 20(b), which ensures a tidy coil winding. In order to rotate the disk for coil winding, a shaft can be applied to the hole for the metal rod as shown in FIGS. 19(a) and (b).

Figure 21:
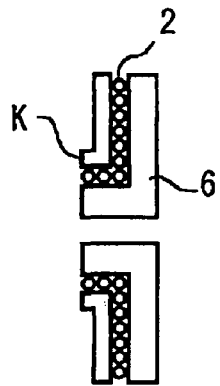
FIG. 21 is a schematic view of a coil winding manner around a short cylindrical protrusion.

FIG. 21 is the schematic view of a coil winding manner around a short cylindrical protrusion.

Figure 22:
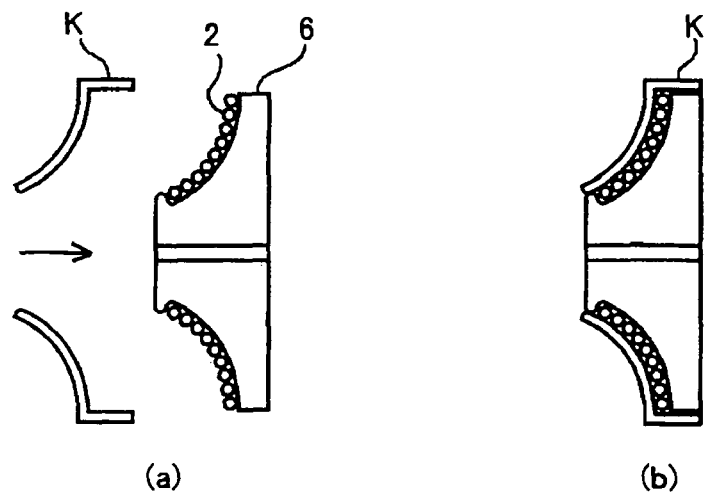
FIG. 22 is a schematic view of a coil winding manner around curved cylindrical protrusion.

FIG. 22 is the schematic view of a coil winding manner around curved cylindrical protrusion.

Since a overhung portion is formed around a top circumference of the curved cylindrical protrusion as shown in FIG. 22(a), the coil 2 can be wound around a curved circular surface of the cylindrical protruded magnetic substance for the magnetic path 6 without fail. After the coil is wound, the cover K is applied in order to the wound coil from coming out of the magnetic substance as shown in FIG. 22(b).

Figure 23:
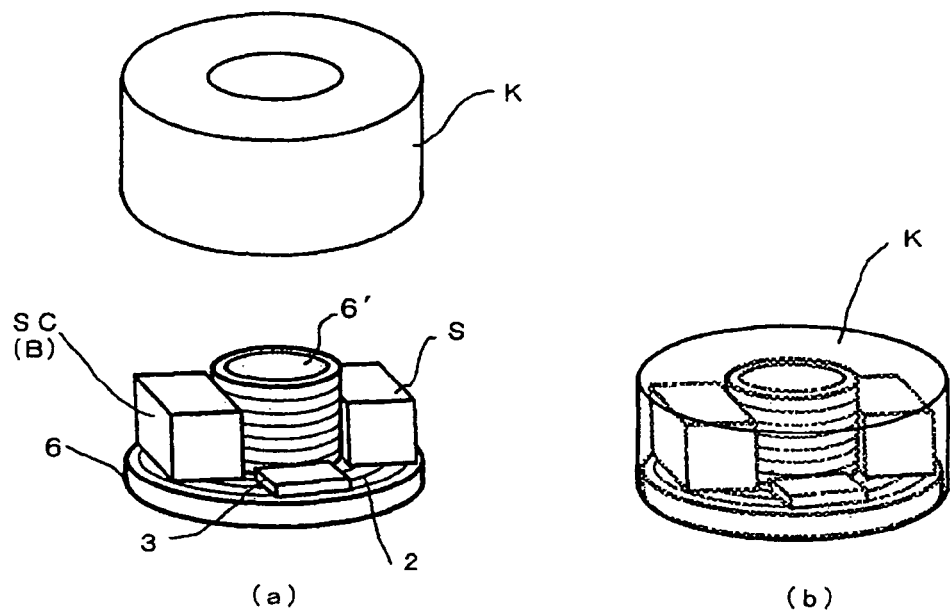
FIG. 23 is schematic views illustrating an applied example of the sensor system by the present invention.

FIG. 23 is schematic views illustrating the applied example of the sensor system by the present invention. FIG. 23(a) shows the sensor system without being covered by the cover K, which is made of materials not interfering the magnetic field, such as ceramics, plastics and the like. In an available space of the sensor system, a super capacitor (SC), a battery B and the like are arranged, in order to convert the present sensor system into an active one. Further other sensing element, a timer and the like can be added to the sensor system and acquired necessary data can be recorded in the IC 3. The recorded data can be transmitted outside via the vertical magnetic field components to an external coil connected to a reader. FIG. 23(b) shows the sensor system covered with the cover K.

Figure 24:
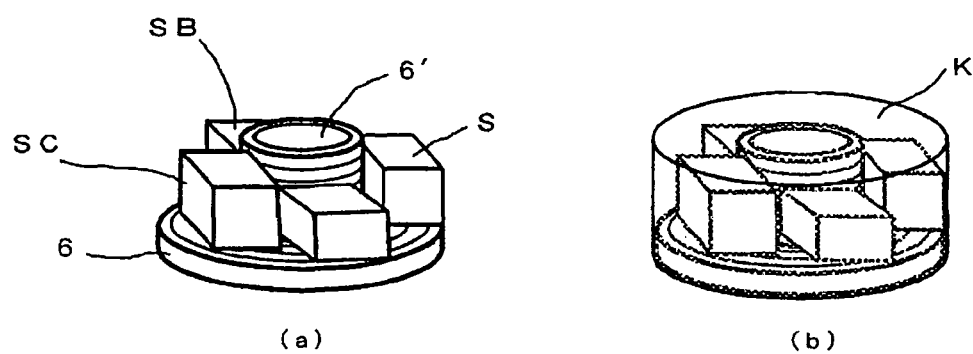
FIG. 24 is schematic views illustrating another applied example the sensor system by the present invention.

FIG. 24 is schematic views illustrating another applied example the sensor system by the present invention.

FIG. 24(a) shows a constitution where the super capacitor and a secondary battery SB are combined, so that the sensor system can be operable for a longer period when the secondary battery is charged for a short period. In the present sensor system a packaged ICP is employed instead of the IC. FIG. 24(b) shows the sensor system covered with the cover K.

Figure 25:
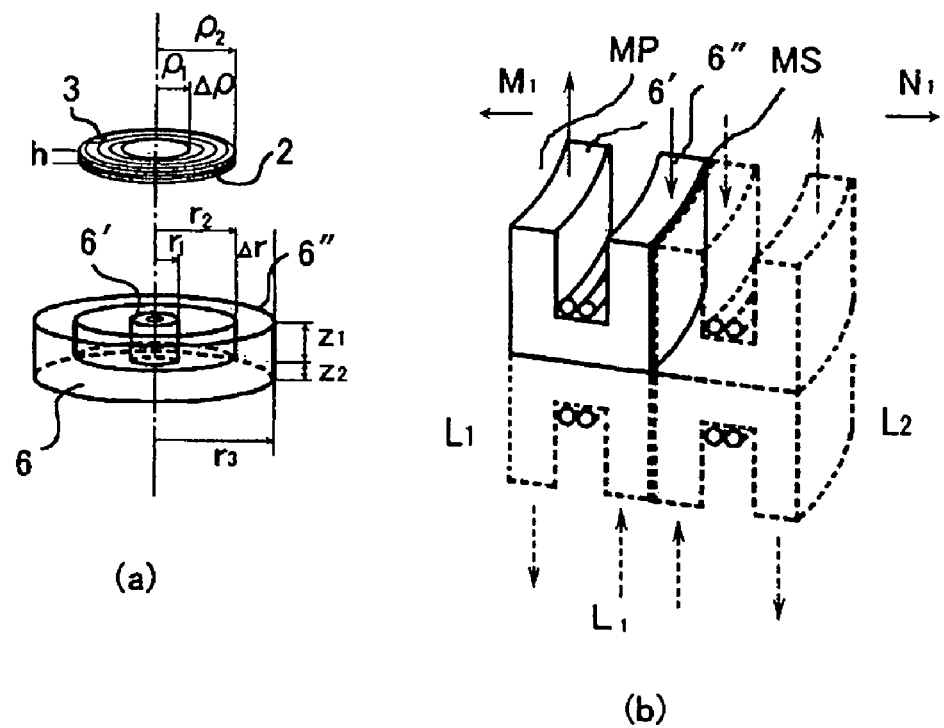
FIG. 25 is schematic perspective views of other embodiment of the vertical magnetic field component exciting sensor system.

FIG. 25 is schematic perspective views of other embodiment of the vertical magnetic field component exciting sensor system. In the present embodiment, the sensor system can be buried under the metal surface. The sensor system shown in FIG. 24 has the central cylindrical protrusion. On the other hand, as shown in FIG. 25, the present sensor system comprises an outer ring structured cylinder for a vertical magnetic path 6" in addition to the central vertical magnetic path 6' as shown in FIG. 25(a).

These vertical magnetic paths 6', 6" are integrally connected to the flat disk for the horizontal magnetic path 6 at the bottom.

Paths for magnetic field components are formed by the vertical magnetic paths 6', 6" and the magnetic path formed in the flat disk. In the above-explained embodiments, the flat disk with the vertical cylindrical protrusion is mounted on the metal surface. But in the present embodiment, magnetic field components penetrated from the vertical magnetic path 6" in the center direction come out of the central vertical magnetic path 6'. In other words magnetic field components vertically penetrated from the center come out of the circumference of the outer ring structured cylinder.

The central cylindrical protrusion for the vertical magnetic path 6' has a radius of $r_1$ and a height of $Z_1$, the center portion the protrusion is hollow or has the metal rod MP therein. As mentioned above, even if the metal rod is not inserted in the center, the vertical magnetic field components can be excited due to the existing magnetic path 6'. The flat disk for the magnetic path 6 has a thickness of $Z_2$. The outer ring structured cylinder has an inner radius of $r_2$ and an outer radius of $r_3$, as a result its wall has a thickness of $\square r = r_3 - r_2$. It has the same height as that of the central cylindrical protrusion, namely, $Z_1$. The sensor system or tag is constituted by arranging the coil 2 (or C) and the IC 3 in a space between radius $r_2$ and radius $r_1$. If an inner radius $\rho_i$ and an outer radius $\rho_2$ of the coil are determined so as to satisfy the following equations, $$\rho_1 \geq r_1$$

and, $$\rho_2 \leq r_2$$

The coil is fitted snugly to the space of the magnetic substance. The height h of the coil 2 is determined to satisfy an equation: $h<Z_1$, since an additional space for putting the IC 3 and a potting material for a package should be reserved. The IC is packaged at both ends of the coil which are soldered to lead wires of the IC. Alternatively, the IC is sealed by a potting method or the like after the IC is mounted on a substrate and connected to the both ends of the coil by a bonding method or the like. An inductance value of the coil varies depending on a capacity of the IC chip. However, since a capacitor is adjusted to resonate with the IC chip, the inductance value is set several μH, so that the winding number of the coil is several turns at most. However, if two coils are connected in parallel, the inductance value is lowered to ca. half, so that the winding number can be doubled. FIG. 25(b) is a partially enlarged view of the magnetic substance shown in FIG. 25(a). As mentioned above, the inductance value of the coil can be adjusted by varying the winding number of the coil. The inductance value also can be adjusted by varying a wire thickness of the coil. If a rather flat sensor system is required, it can be obtained in the following manner. A coil pattern is printed on magnetic powder together with a spinel-structured sheet, which is sintered afterward.

Figure 26:
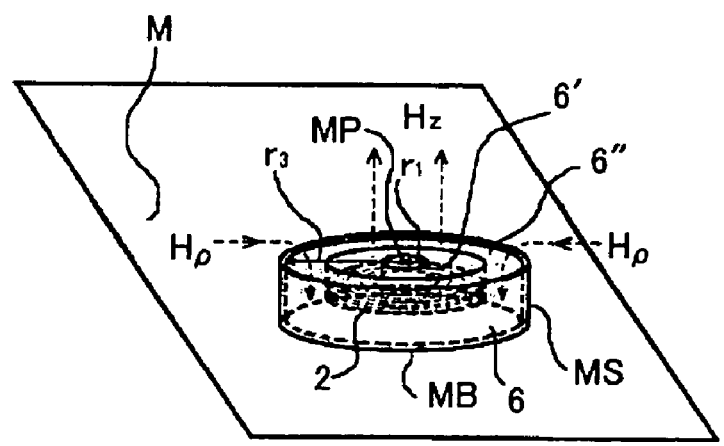
FIG. 26 is a schematic view illustrating the sensor system in FIG. 25 mounted on a metal plate.

FIG. 26 is the schematic view illustrating the sensor system in FIG. 25 buried under the metal surface M after mounting on the metal plate MB and surrounding the outer ring structured cylinder with a metal plate MS. The horizontal magnetic field components Hρ are diverted vertically along the magnetic path 6" formed in the outer ring structured cylinder, and diverted horizontally along the magnetic path 6 formed in the flat disk, and finally diverted upward in the central cylindrical protrusion as the vertical magnetic field components Hz. At the same time an induced voltage is generated in the coil C, so that the induced voltage is supplied to the IC or the IC package attached to the ends of the coil.

Figure 27:
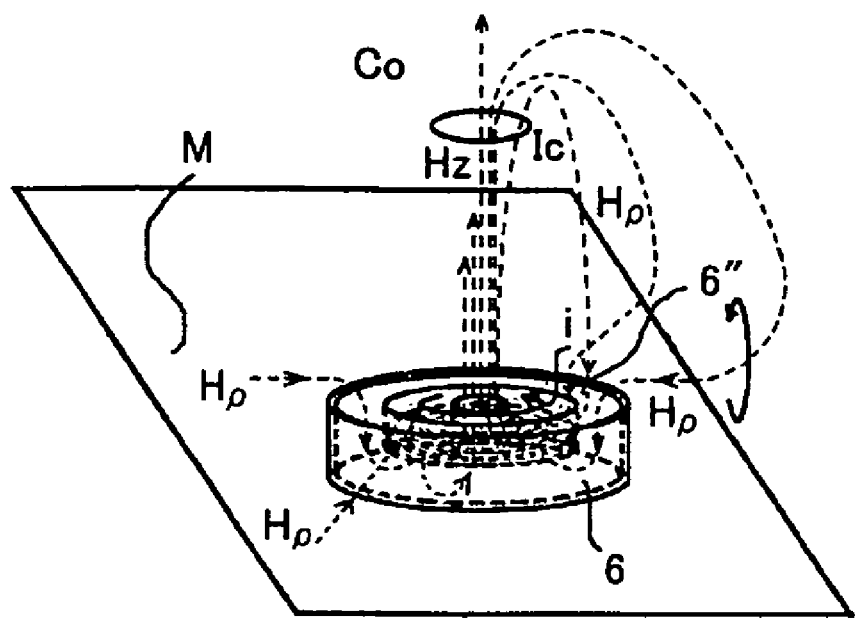
FIG. 27 is a schematic view for explaining an interaction between the senor system and an external coil Co

FIG. 27 is the schematic view for explaining an interaction between the senor system and an external coil $C_o$.

Portions of the magnetic field components passing thorough outside of the external coil $C_o$ arranged above, penetrate into the magnetic path 6" formed in the outer ring structured cylinder, but remaining portions passing through the outside excite the mental surface and generate a circular current i. This circular current is a kind of eddy current, and also a circular surface current. Since the electric current flows circularly, the magnetic field shows a radial pattern. Since a change in electric field near the metal surface causes a displacement current, circular displacement currents flow near a coil tassel and the metal surface.

Figure 28:
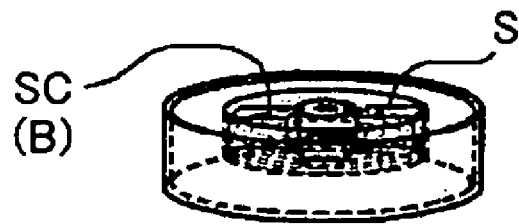
FIG. 28 is a perspective view of an example of active tag constituted by the super capacitor SC, the battery B and the sensor S arranged in available spaces.

FIG. 28 is the perspective view of an example of active tag constituted by the super capacitor SC, the battery B and the sensor S arranged in available spaces.

Figure 29:
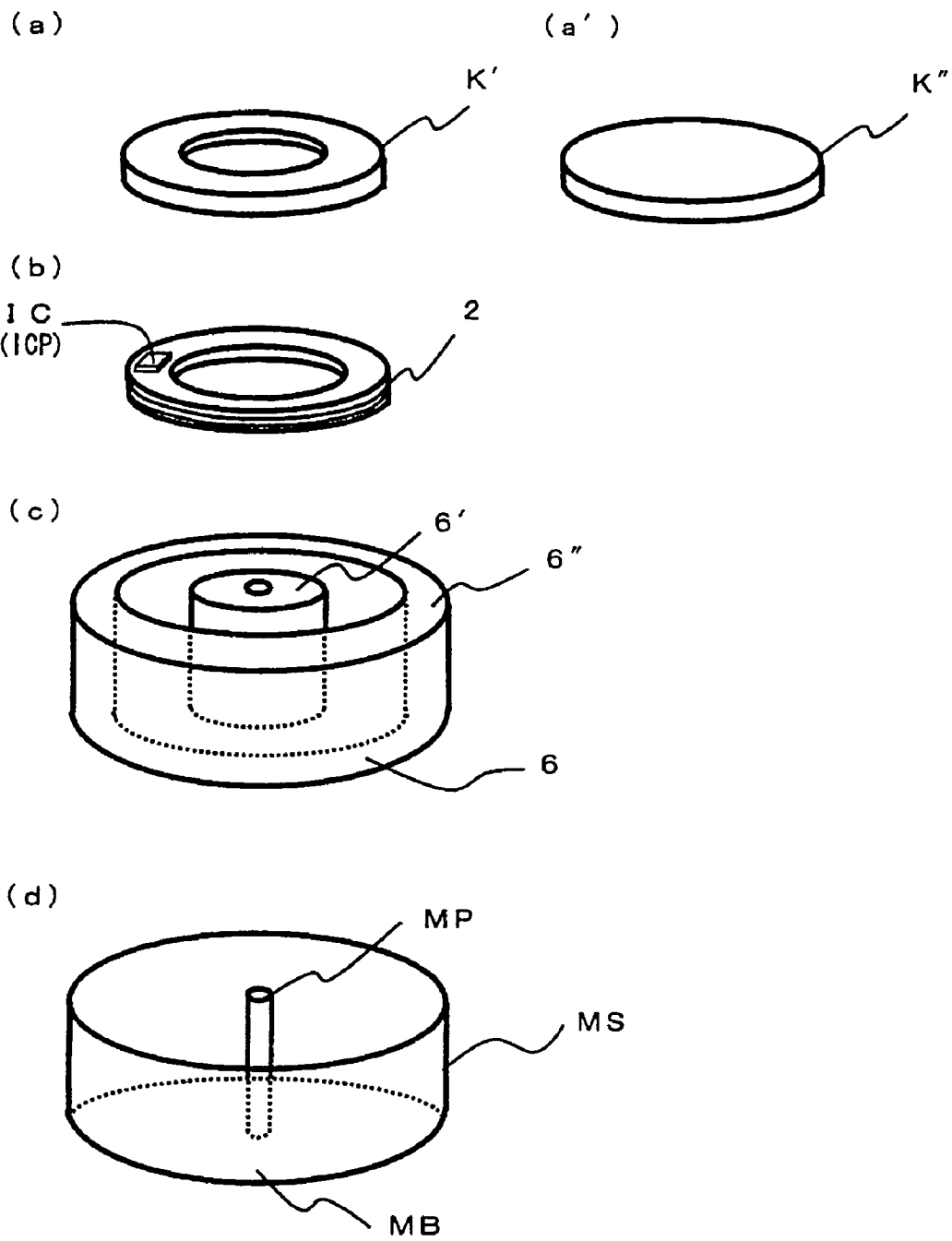
FIG. 29 is schematic views of respective components of a sensor or a tag.

FIG. 29 is schematic views of respective components of the sensor or the tag

FIG. 29(a) shows a cover K' made of ceramics or plastics for protecting the coil 2, the IC and other internal components and for making the surface of the sensor system flat.

FIG. 29(a') shows a cover K" for protecting and for hiding internal components by covering the entire surface of the sensor system.

FIG. 29(b) shows the coil 2, the IC and the IC package ICP.

FIG. 29(c) shows the magnetic paths 6', 6" formed in the magnetic substances.

FIG. 29(d) shows the metal plate MB, the metal rod MP and the surrounding metal plate MS.

Figure 30:
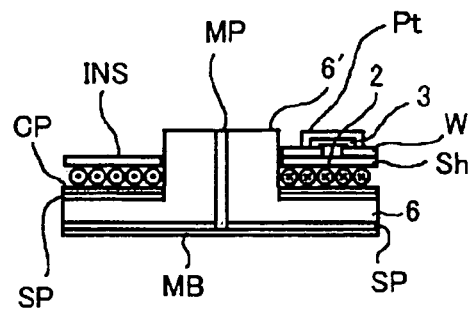
FIG. 30 is cross-sectional views illustrating coil arranging manners in sintered magnetic powder.
Figure 30:
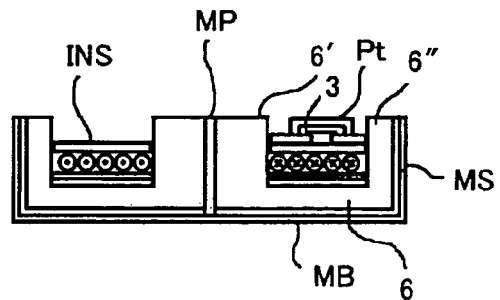

FIG. 30 is cross-sectional views illustrating coil arranging manners in sintered magnetic powder. FIG. 30(a) shows a laying type and FIG. 30(b) shows an embedded type.

FIG. 1 to FIG. 29 are referred for explaining the principle of the present sensor system and functions of the respective components such as the coil and the magnetic substances.

On the other hand, FIG. 30 is for explaining coil arranging manner together with other components. A powdered magnetic substance is put in a mold and stamped. A spinel-structured circular sheet is mounted on the stamped powder. A printed spiral coil 2 is mounted on the circular sheet and further insulated by insulating sheet INS. The coil is connected to upper metal pads or lead wires W by a through-hole Sh. Since the upper metal pads or lead wires are for bonding the IC to the above-explained coil assembly, flip chip typed pads are coated over the coil assembly. The coated coil assembly is sintered so that an integrated magnetic substance is obtained. Finally the IC is bonded to the sintered pads by soldering or the like.

The metal surface MB and the surrounding metal plate can be obtained by sintering coated silver paste together with the integrated magnetic substance, or by a vapor deposition or the like on the sintered integrated magnetic substance afterward.

Figure 31:
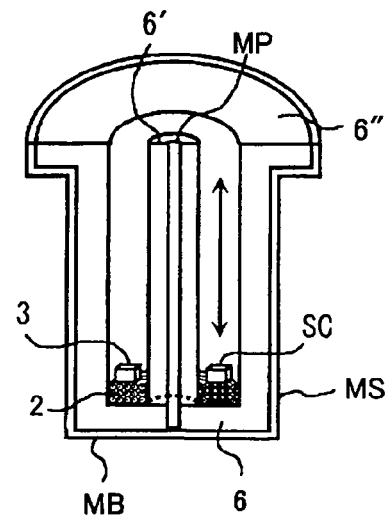
FIG. 31 is a cross-sectional view illustrating a component embedding manner in a long thin cylinder for thicker components or long thin components.

FIG. 31 is the cross-sectional view illustrating a component embedding manner in a long thin cylinder for thicker components or long thin components. Basically a structure of the present embodiment is almost similar to embodiments shown in FIGS. 25-29 or FIG. 30(b). In the present embodiment, the magnetic path 6', 6" extend long in a Z axis, so that the magnetic path 6 at the bottom playing a role for providing returning paths. The coil can be fixed to either at the upper entrance or the bottom. If the cylinder were infinitely long, horizontal magnetic path 6 would have no effects for enhancing the vertical magnetic field components. The upper inlet of the magnetic substance can have an inner protrusion or an outer flange so as to capture the magnetic field components more easily.

Figure 32:
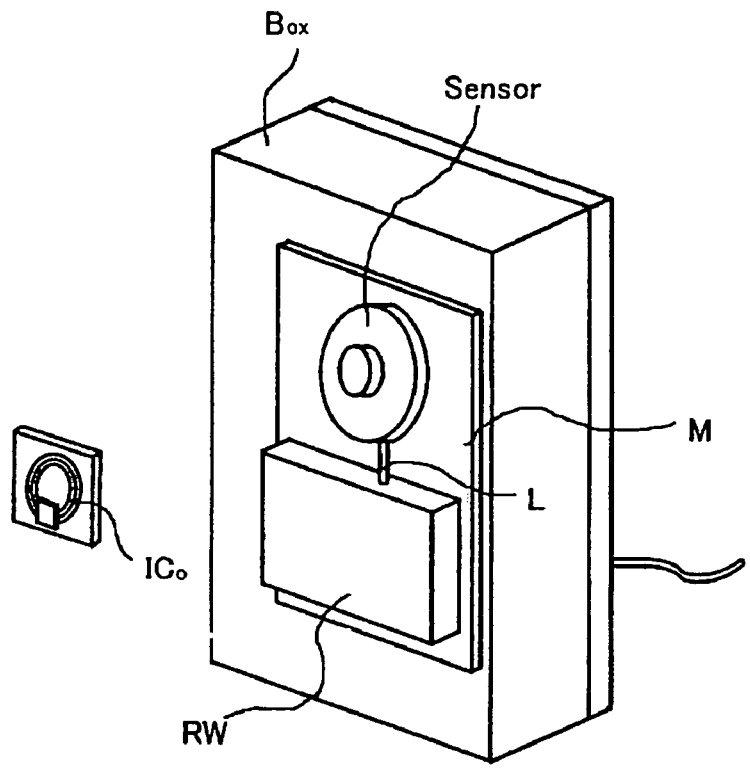
FIG. 32 is a perspective view illustrating an applied example of the sensor system by the present invention.

FIG. 32 is the perspective view illustrating the applied example of the sensor system by the present invention. The sensor capable of exciting vertical magnetic field components by the present invention is mounted on the metal plate M and connected to a reader/writer R/W via a leading wire L. A whole system is accommodated in a plastic box Box. The sensor system interacts with a coil Co of a non-contact type IC card and start communicating each other.

Signals from the reader/writer R/W are transmitted to a local controller or a host computer or signals from the local controller or the host computer are received by the reader/writer R/W.

Figure 33:
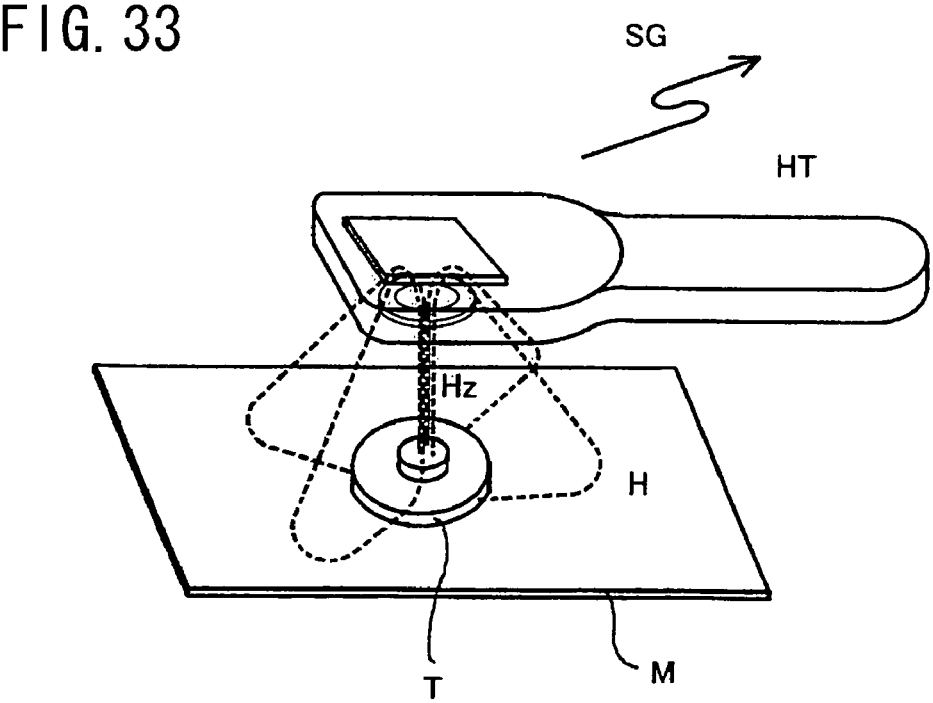
FIG. 33 is a perspective view illustrating an applied example of the tag by the present invention.

FIG. 33 is the perspective view illustrating the applied example of the tag by the present invention. The tag T mounted on the metal plate M magnetically communicates with a handy terminal HT. The handy terminal transmits signals SG wirelessly to other devices.

Figure 34:
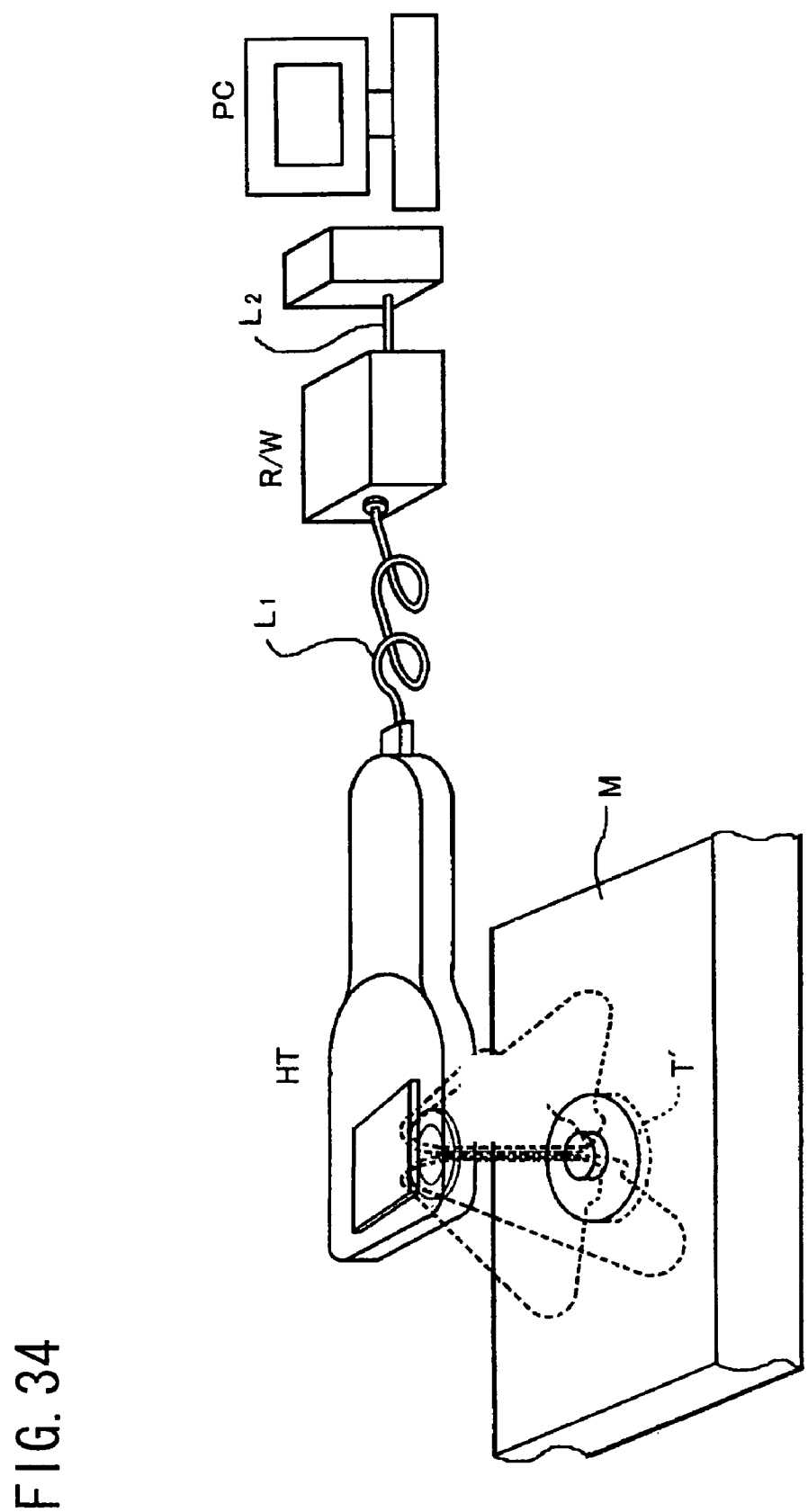
FIG. 34 is a schematic view illustrating other applied example of the tag integrated in the system.

FIG. 34 is the schematic view illustrating other applied example of the tag integrated in the system. In the present example, a tag T comprising the IC is buried under the metal surface M. Signals from the IC are transmitted to the handy terminal HT via the magnetic field and further transmitted to a computer PC via a cable L1, the reader/writer R/W and cable L2, and vice versa.

The above-mentioned examples are only parts of exemplary embodiments. Except these embodiments, the sensor system by the present invention can be employed as tags and sensors in various ways.

Conclusion

As described above, the axial symmetric vertical magnetic field component exciting sensor system by the present invention can generate the vertical magnetic field components on the metal plate, and the generated vertical magnetic field components can interact with other vertical magnetic field components, even if the sensor system is mounted on the metal plate or buried under the metal plate. Conventionally it was difficult to obtain such vertical magnetic field components, since the metal plate worked to offset generating the vertical magnetic field components.

Since the principle by the present invention can be applied to conventionally available tags such as circular tags, rectangular tags and the like, the sensor system by the present invention can be applied in various ways.

Therefore the axially symmetric vertical magnetic field component exciting sensor system by the present invention can be expected to develop various effective applications.

What is claimed is:

1. A sensor system comprising an axially symmetric vertical magnetic field component exciting sensor system comprising:
   an axially symmetrical magnetic substance comprising a circular, oval or polygonal shaped flat disk and a protrusion capable of forming magnetic path for exciting vertical magnetic field components, formed on a center of the flat disk, wherein:
   said sensor system is used for a response system having an IC connected to and wound by a coil which generates signals, wherein
   said sensor system is directly mounted on a metal surface or buried in a hollow formed on the metal surface, and wherein
   the hollow is formed along a central axis of the flat disk.

2. The sensor system according to claim 1, wherein: the protrusion of said magnetic substance is formed in a cylindrical, oval-cylindrical, polygonal, polygonal, circular, oval or polygonal pyramid shape.

3. The sensor system according to claim 1, wherein: the lower surface of the flat disk of said magnetic substance is constituted so as to be fitted to the metal surface.

4. The sensor system according to claim 1, wherein: a metal rod is buried along a central axis of said flat disk.

5. The sensor system according to claim 1, wherein: a coil is wound around circumference (in a $\psi$ direction) of the protrusion in a parallel direction to the central axis of said magnetic substance.

6. The sensor system according to claim 1, wherein: the coil is wound circularly on the flat disk of said magnetic substance in a radial direction parallel to the metal surface.

7. The sensor system according to claim 1, wherein: the metal surface is a metal thin plate or a metal foil coil is fitted to the rear surface of the flat disk opposite to the protrusion of said magnetic substance so as to form the metal surface, or said metal surface is formed by a deposition or a printing method.

8. The sensor system according to claim 1, wherein: said magnetic substance further comprises an outer ring structured cylinder formed on a circumference of the flat disk.

9. The sensor system according to claim 8, wherein: a metal thin plate or a metal foil coil is fitted to the outer circumference of the ring structured cylinder of said magnetic substance so as to form the metal surface, or said metal surface is formed by a deposition or a printing method.

10. The sensor system according to claim 1, wherein: the IC is fitted to an available space in said magnetic substance.

11. The sensor system according to claim 1, wherein: the IC, a sensor, a capacitor and battery are mounted above the flat disk of the magnetic substance.

12. The sensor system according to claim 1, wherein: a hole is formed on the metal surface and a hole is formed on the assembled magnetic substance such that said assembled magnetic substance is snugly fitted to the metal surface wherein the hole on the metal surface has nearly the same thickness, the same shape, and same depth as the shape, thickness, and depth of said magnetic substance.

13. The sensor system according to claim 1, wherein: a top end of an outer ring structured cylinder of said magnetic substance, which is fitted to the metal surface, is formed partially wider.

14. The sensor system according to claim 1, wherein: a thickness of said magnetic substance is formed longer so as to be fitted to a deep hole of the metal surface.

15. A detecting system constituted by employing the tag or sensor system specified in claim 1.

16. A sensor system comprising an axially symmetric vertical magnetic field component exciting sensor system comprising:
   an axially symmetrical magnetic substance comprising a circular or polygonal shaped flat disk on which a flatly wound coil is mounted, wherein the coil is mounted only on the disk, and a protrusion capable of forming magnetic path for exciting vertical magnetic field components, formed on a center of the flat disk.

17. The sensor system according to claim 16, wherein: a circular or rectangular tag mount is in the center of the flat disk of said magnetic substance by threading through the protrusion of said magnetic substance.

18. The sensor system according to claim 16, wherein: a hole is formed in the center of a conventional circular or rectangular tag.

* * * * *